US012226893B2

United States Patent
Kaul et al.

(10) Patent No.: US 12,226,893 B2
(45) Date of Patent: Feb. 18, 2025

(54) GRIPPING ASSEMBLIES INCLUDING AN ADHESIVE ASSEMBLY

(71) Applicant: Toyota Research Institute, Inc., Los Altos, CA (US)

(72) Inventors: Lukas S. Kaul, Mountain View, CA (US); Amar Hajj-Ahmad, Stanford, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 4 days.

(21) Appl. No.: 18/182,002

(22) Filed: Mar. 10, 2023

(65) Prior Publication Data
US 2024/0300116 A1    Sep. 12, 2024

(51) Int. Cl.
*B25J 15/00* (2006.01)
*B25J 15/06* (2006.01)

(52) U.S. Cl.
CPC ......... *B25J 15/0052* (2013.01); *B25J 15/008* (2013.01); *B25J 15/0616* (2013.01)

(58) Field of Classification Search
CPC ... B25J 15/0052; B25J 15/008; B25J 15/0616
See application file for complete search history.

(56) References Cited

U.S. PATENT DOCUMENTS

| | | | | |
|---|---|---|---|---|
| 4,887,858 | A * | 12/1989 | Gazzarrini | B65H 3/20 294/212 |
| 9,114,535 | B2 | 8/2015 | Wigren | |
| 9,511,528 | B2 * | 12/2016 | Wong | D01F 6/44 |
| 10,864,555 | B2 | 12/2020 | McCoy, Jr. et al. | |
| 11,207,786 | B1 * | 12/2021 | Polido | B25J 15/0052 |
| 2016/0052144 | A1 | 2/2016 | Spicer et al. | |
| 2022/0331993 | A1 | 10/2022 | Nguyen | |

FOREIGN PATENT DOCUMENTS

| | | |
|---|---|---|
| CN | 210207348 U | 3/2020 |
| DE | 4444960 A1 | 6/1996 |

* cited by examiner

*Primary Examiner* — Lynn E Schwenning
(74) *Attorney, Agent, or Firm* — Dinsmore & Shohl LLP (57) ABSTRACT

A gripping assembly includes a gripping mechanism for engaging an object and an adhesive assembly coupled to the gripping mechanism. The adhesive assembly includes an adhesive sheet and an engagement mechanism operable between an active state and an inactive state. The engagement mechanism deforms the adhesive sheet to contact the object when operated in the active state.

20 Claims, 8 Drawing Sheets

GRIPPING ASSEMBLIES INCLUDING AN ADHESIVE ASSEMBLY

TECHNICAL FIELD

The present specification generally relates to gripping assemblies and methods of operating gripping assemblies, and more specifically, to robotic grippers having adhesive assemblies.

BACKGROUND

Gripping assemblies are commonly used in robotic picking applications, and may provide a versatile way of gripping a variety of items that often have advantages over traditional tools. Typical gripping assemblies utilize gripping mechanisms, such as suction cups, for grasping an object to be moved. However, standard gripping mechanisms may be unsuited for performing side grasp operations as standard gripping mechanisms may be incapable of accounting for shear forces acting on the object during a side grasp.

Accordingly, a need exists for a gripping assembly that is capable of reliably performing side grasp operations.

SUMMARY

In one embodiment, a gripping assembly is disclosed. The gripping assembly includes a gripping mechanism for engaging an object and an adhesive assembly coupled to the gripping mechanism. The adhesive assembly includes an adhesive sheet and an engagement mechanism operable between an active state and an inactive state, the engagement mechanism deforming the adhesive sheet to contact the object when operated in the active state.

In another embodiment, a suction tool assembly is disclosed. The suction tool assembly includes a suction mechanism, a pump in fluid communication with the suction mechanism to provide a suction force to the suction cup for engaging an object, and an adhesive assembly. The adhesive assembly includes an adhesive sheet and an engagement mechanism operable between an active state and an inactive state, the engagement mechanism deforming the adhesive sheet to contact the object when operated in the active state. The suction tool assembly further includes an electronic control unit that independently operates each of the pump and the adhesive assembly.

In yet another embodiment, a method of performing a gripping operation is disclosed. The method includes positioning a gripping mechanism of a gripping assembly adjacent an object. The gripping assembly includes an adhesive assembly including an engagement mechanism and an adhesive sheet. The method further includes extending the adhesive assembly of the gripping assembly from a retracted position to an extended position, such that the adhesive assembly is adjacent the object, gripping the object with the gripping mechanism, and activating the engagement mechanism of the adhesive assembly into an active state such that the adhesive sheet deforms to contact the object.

These an additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals in which:

Corresponding reference characters indicate corresponding parts throughout the several views. The exemplifications set out herein illustrate at least one embodiment of the present disclosure, and such exemplifications are not to be construed as limiting the scope of the present disclosure in any manner.

DETAILED DESCRIPTION

Embodiments of the present disclosure are directed to gripping assemblies and methods of performing gripping operations. For example, in embodiments, a gripping assembly may include a gripping mechanism for engaging an object and an adhesive assembly coupled to the gripping mechanism. The adhesive assembly may include an adhesive sheet and an engagement mechanism operable between an active state and an inactive state, and the engagement mechanism may deform the adhesive sheet to contact the object when operated in the active state.

In traditional gripping assemblies, the gripping mechanism is positioned at an end effector of a robot, such that the gripping mechanism may be in direct contact with an object to be grasped. As utilized herein, the term "end effector" may refer to a device or tool that is connected to an end of a robotic arm and is the part of the robot that interacts with an environment.

Gripping assemblies are traditionally best suited to create a gripping force in the direction of the gripping mechanism, or a normal direction. Accordingly, gripping assemblies may typically ensure that the normal force acting on an object to be grasped and the gravitational force acting on the object align by performing top grasp operations, in which the gripping mechanism grasps the object being moved from above. However, during side grasp operations, the normal force exerted on the object by the gripping mechanism is perpendicular to the gravitational force acting on the object, such that shear forces are generated on the gripping mechanism. In these embodiments, the shear forces that act on the gripping mechanism during a side grasp operation may cause the gripping mechanism to deform, such that the gripping mechanism is incapable of securely grasping and moving the object.

The gripping assembly disclosed herein may account for the shear forces that act on the gripping mechanism during a side grasp operation by including an adhesive assembly that may be deployed to provide further support to the object being grasped. Using an engagement mechanism, an adhesive material may be brought into contact with the object, such that, when the object is lifted, the adhesive material supports a tangential load created by the object, thereby limiting the deformation of the gripping mechanism and ensuring its continued contact with the object.

Embodiments of gripping assemblies and methods for performing gripping operations will now be described in more detail herein with reference to the drawings and where like numbers refer to like structures.

Figure 1:
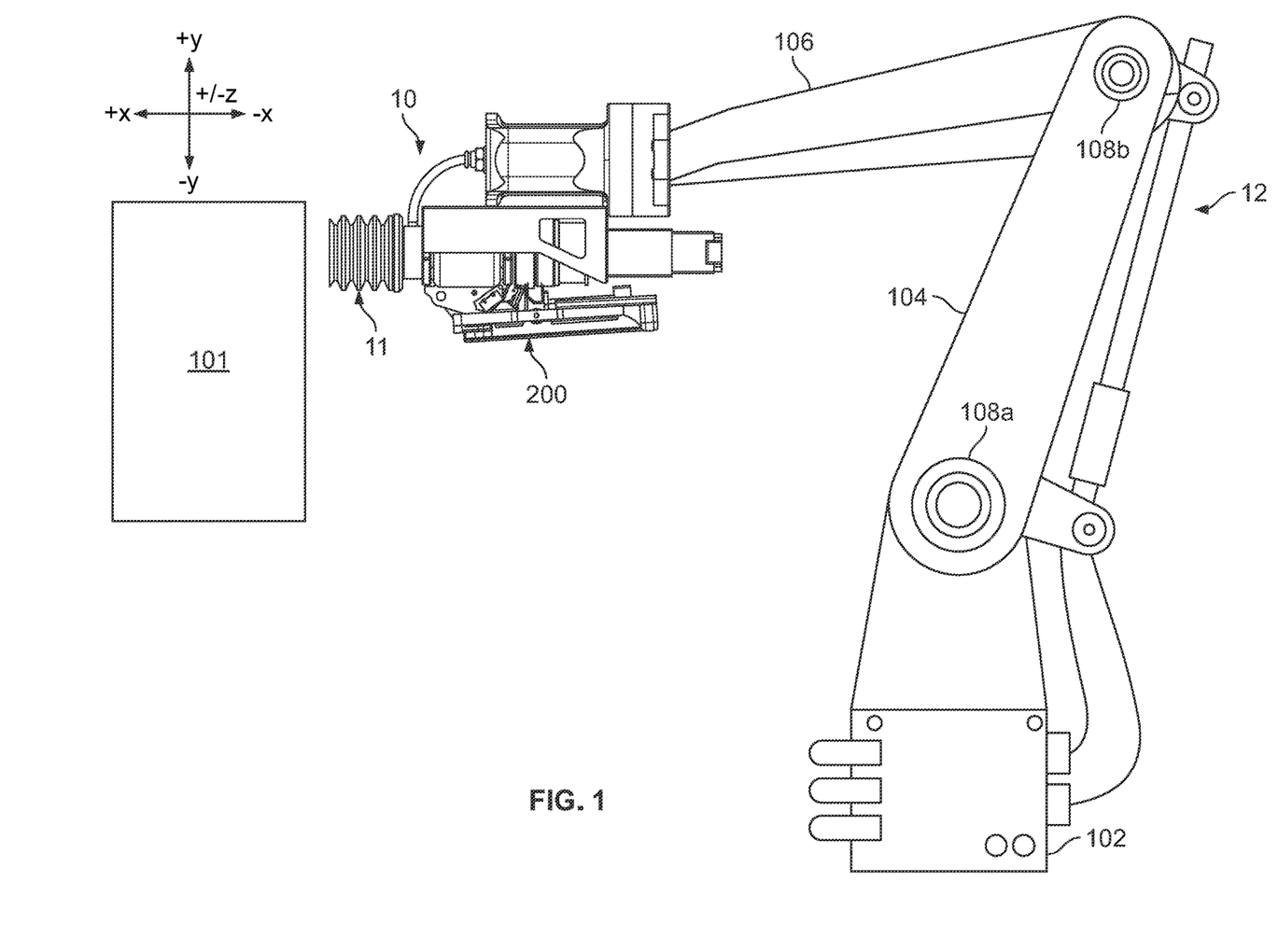
FIG. 1 schematically depicts a side view of an illustrative robotic arm including an embodiment of a gripping assembly, according to one or more embodiments shown and described herein.

Referring now to the drawings. FIG. 1 depicts an illustrative robotic arm 12 including an end effector for performing one or more functions. In embodiments, the end effector includes a gripping assembly 10 having a gripping mechanism 11 for manipulating an object 101. For example, the gripping mechanism 11 may include a suction tool, such as a suction tool assembly 14 (FIG. 2), a mechanical gripper, a finger gripper, a magnetic gripper, or any other similar tool operable to manipulate the object 101. Furthermore, the gripping assembly 10 may include an adhesive assembly 200 coupled to the gripping mechanism 11, which may further aid in engaging the object 101, as will be described in additional detail herein. Accordingly, it should be appreciated that the illustrative robotic arm 12 depicted in FIG. 1 may provide particular use in pick-and-place applications. However, it should be understood that the robotic arm 12 is not limited to this use and may be used for other purposes without departing from the scope of the present disclosure.

In some embodiments, the robotic arm 12 may generally include a base 102 coupled to one or more arm segments (e.g., a first arm segment 104 and/or a second arm segment 106) via one or more joints 108a, 108b thereby providing the robotic arm 12 with a wide range of motion. As robotic arms for pick-and-place applications are generally understood, the robotic arm 12 depicted in FIG. 1 is not described in further detail herein. In addition, although the robotic arm 12 is depicted as including the gripping assembly 10 located at an end of the one of the second arm segment 106, it should be appreciated that the gripping assembly 10 may be located at any suitable location of the robotic arm 12.

Figure 2:
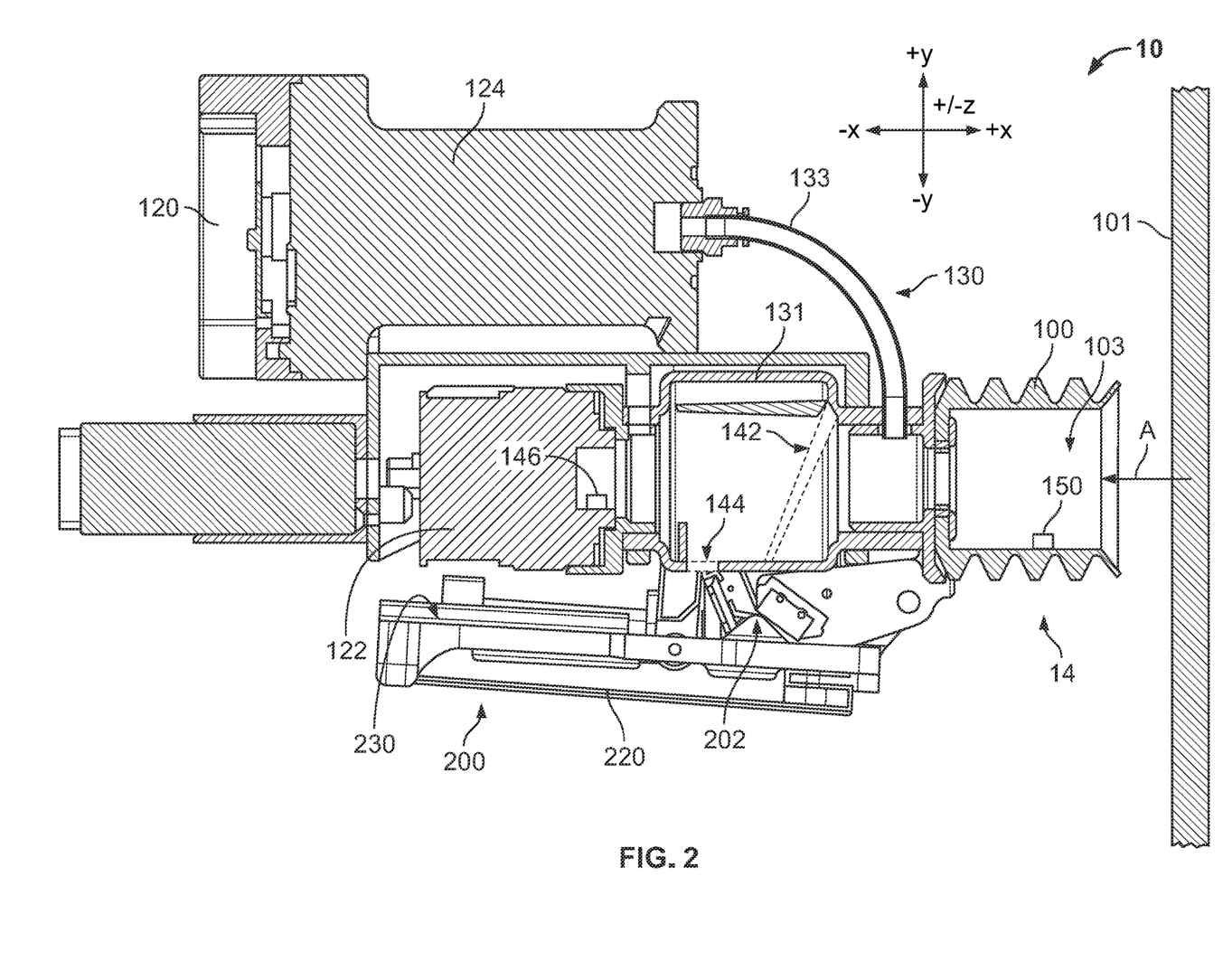
FIG. 2 schematically depicts a cross-sectional side view of the gripping assembly of FIG. 1, according to one or more embodiments shown and described herein.

Referring now to FIG. 2, a schematic view of a gripping assembly 10 is depicted. For purposes of illustration, the gripping mechanism 11 of the gripping assembly 10 is depicted as a suction tool assembly 14 having a suction mechanism 100, such as a suction cup, bellows, or other suitable mechanism, which may be used to releasably couple the suction tool assembly 14 to the object 101 by drawing the object 101 in the direction of arrow A when the suction tool assembly 14 is operated, as will be discussed in more detail herein. Although the suction mechanism 100 is depicted in FIG. 2 as being a suction cup, it should be understood that the suction mechanism 100 may take any suitable form such that the suction mechanism 100 couples the suction tool assembly 14 to the object 101. For example, in some embodiments, the shape of the suction mechanism 100 may correspond to the shape of the object 101 being gripped by the suction tool assembly 14.

The suction tool assembly 14 may further include at least one pump 120. fluidly coupled to the suction mechanism 100. For example, as depicted in FIG. 2, the suction tool assembly 14 may include a first pump 122 and a second pump 124. In these embodiments, a connection mechanism 130 (e.g., a hose, tube, etc.) may be used to fluidly couple the first pump 122 and the second pump 124 to the suction mechanism 100. It should be understood that the connection mechanism 130 may fluidly couple the first pump 122 and the second pump 124 to the suction mechanism 100 via any suitable connection (e.g., threaded connection, adhesive, welding, brazing, etc.). In embodiments, the connection mechanism 130 may include a first connection part 131 extending from the first pump 122 to the suction mechanism 100, and a second connection part 133 extending from the second pump 124 to the first connection part 131. As such, the first pump 122 is in fluid communication with the suction mechanism 100 via the first connection part 131, and the second pump 124 is in fluid communication with the suction mechanism 100 via the second connection part 133 and the first connection part 131. However, it should be appreciated that, in embodiments, the second connection part 133 may be in direct fluid communication with the suction mechanism 100 without being connected to the first connection part 131. As used herein, the first pump 122 and the second pump 124 may be collectively referred to as the pumps 120.

Referring still to FIG. 2, the plurality of pumps 120 may be positioned adjacent the suction mechanism 100, such that the suction tool assembly 14 is arranged as an integrated suction tool. In these embodiments, the entire suction tool assembly 14 may be positioned at an end effector of a robot, or other similar device, which may be used to position the suction tool assembly 14 adjacent the object 101 to be gripped during a suction operation. Although the suction tool assembly 14 is depicted as being an integrated suction tool, it should be understood that, in some embodiments, the suction tool assembly 14 may be arranged as a distributed suction tool. In these embodiments, the plurality of pumps 120 may be positioned at a base of the robot and the suction mechanism 100 may be positioned at the end effector of the robot.

Referring still to FIG. 2, the first pump 122 and the second pump 124 may each be operable to optimize a working parameter of the suction tool assembly 14, such as a flow rate or a pressure differential of the suction tool assembly 14. Although reference will be made herein to the flow rate and the pressure differential of the suction tool assembly 14, it should be understood that the plurality of pumps 120 may be operable to optimize any number of working parameters of the suction tool.

To optimize the working parameters of the suction tool assembly 14, the first pump 122 may provide a first suction force and a first flow rate to the suction mechanism 100, while the second pump 124 may similarly provide a second suction force and a second flow rate to the suction mechanism 100. Notably, the first flow rate and the second flow rate provided by the first pump 122 and the second pump 124, respectively, may help ensure that imperfect seals are avoided between the suction mechanism 100 and the object 101 being gripped, and may make the initial creation of a seal between the suction mechanism 100 and the object 101 easier. Furthermore, the first suction force and the second suction force may work to achieve a near perfect vacuum within the suction mechanism 100 by creating the highest possible pressure differential between a pressure within an interior 103 the suction mechanism 100 and ambient pressure.

In these embodiments, the first pump 122 may be a high flow pump, such that the first pump 122 may be responsible for increasing the flow rate of the suction tool assembly 14. Furthermore, the second pump 124 may be a high pressure pump, such as a high pressure differential pump, that may be used to increase the pressure differential between the interior 103 of the suction mechanism 100 and ambient pressure outside of the suction mechanism 100. In these embodiments, the first pump 122 may be operable to provide a first flow rate that is greater than the second flow rate provided by the second pump 124. In contrast, the second pump 124 may be operable to provide a second suction force to the suction mechanism 100 that is greater than the first suction force provided by the first pump 122.

It should be noted that, because of the high airflow generated by the first pump 122, a cross-section of the first connection part 131 of the connection mechanism 130 between the first pump 122 and the suction mechanism 100 is sufficiently large to facilitate the high airflow. In these embodiments, the cross-section of the first connection part 131 of the connection mechanism 130 extending between the first pump 122 and the suction mechanism 100 is larger than a cross-section of the second connection part 133 of the connection mechanism 130 extending between the second pump 124 and the first connection part 131.

Referring still to FIG. 2, the suction tool assembly 14 may further include a plurality of valves associated with the plurality of pumps 120. For example, the suction tool assembly 14 may include a first valve 142 and a second valve 144, both of which may be moved between an open position (solid lines) and a closed position (dashed lines).

In these embodiments, the plurality of valves may be operable to control interactions between the plurality of pumps 120 and the suction mechanism 100. For example, as depicted in FIG. 2, the first valve 142 may be a shutoff valve and may be positioned between the first pump 122 (e.g., the high flow pump) and the suction mechanism 100, for example, within the first connection part 131, such that the first valve 142 may be operable to control the connection between the first pump 122 and the suction mechanism 100. In these embodiments, the first valve 142 may be positioned between the first pump 122 and the suction mechanism 100, such that when the first valve 142 is in the open position, the first pump 122 may fluidly communicate with the suction mechanism 100. In contrast, when the first valve 142 is moved to the closed position, fluid communication between the first pump 122 and the suction mechanism 100 may be obstructed. In these embodiments, the first valve 142 may be manually moved between the open position and the closed position, such as by an external lever (not shown), or may be controlled via an electronic control unit, as will be described in additional detail herein.

Referring still to FIG. 2, the second valve 144 may be a bypass valve, which may control fluid communication between the first pump 122 and ambient air in an external environment. For example, when the second valve 144 is in the open position, the first pump 122 may draw in ambient air from the external environment. However, when the second valve 144 is moved to the closed position, the first pump 122 may be restricted from drawing in ambient air.

In some embodiments, the suction tool assembly 14 may further include a temperature sensor 146. In these embodiments, the temperature sensor 146 may be operable to monitor a temperature of the first pump 122. When the temperature sensor 146 determines that the temperature of the first pump 122 has exceeded a predetermined threshold, the second valve 144 may be moved from the closed position to the open position, or to one of a plurality of intermediate positions, such that ambient air may enter the suction tool assembly 14 and cool the first pump 122. In these embodiments, the second valve 144 may be manually moved between the open position and the closed position, such as by an external lever (not shown), or may be controlled via an electronic control unit, as will be described in additional detail herein. In addition, the second valve 144 may be moved to a selected one of the plurality of intermediate positions between the open position and the closed position based on the temperature of the first pump 122. For example, the second valve 144 may positioned at an intermediate position closer to the open position as the temperature of the first pump 122 increases. Similarly, the second valve 144 may positioned at an intermediate position closer to the closed position as the temperature of the first pump 122 decreases.

In the embodiments described herein, the suction tool assembly 14 may further include a pressure sensor 150. The pressure sensor 150 may be disposed within the interior 103 of the suction mechanism 100 (e.g., within a cavity or the suction mechanism), and may be used to monitor a pressure differential between the interior 103 of the suction mechanism 100 and ambient pressure. In these embodiments, the pressure sensor 150 may include, for example, a barometric pressure sensor and the like.

Referring still to FIG. 2, the gripping assembly 10 may further include an adhesive assembly 200. In these embodiments, the adhesive assembly 200 may include an adhesive sheet 220 and an engagement mechanism 230, which may be utilized to deform the adhesive sheet 220 to contact the object 101 being gripped by the suction tool assembly 14 when the engagement mechanism 230 is in an active state, as will be described in additional detail herein. As further depicted in FIG. 2, the adhesive assembly 200 may also include an arm member 202, such as a retractable arm, which may be used to rotatably couple the adhesive assembly 200 to the connection mechanism 130 of the suction tool assembly 14.

In these embodiments, the adhesive assembly 200 may be utilized to aid the gripping assembly 10 in performing side grasp operations. For example, when the gripping assembly 10 is utilized to perform a side grasp operation on an object, a gravitational force (e.g., in the −y direction as depicted in the coordinate axis of FIG. 2) may act perpendicularly to a gripping normal force (e.g., in the +/−x direction as depicted in the coordinate axis of FIG. 2) that the gripping assembly 10 exerts on the object 101. In these embodiments, forces acting perpendicularly to the gripping normal force may cause the gripping mechanism 11, such as the suction mechanism 100, to deform, which may impact the ability of the gripping assembly 10 to effectively grasp the object 101. In these embodiments, the adhesive sheet 220 of the adhesive assembly 200 may contact the object 101 to counteract the forces acting perpendicularly to the gripping normal force and ensure that the gripping assembly 10 is able to create and maintain effective contact with the object 101 during a side grasp operation.

Figure 3A:
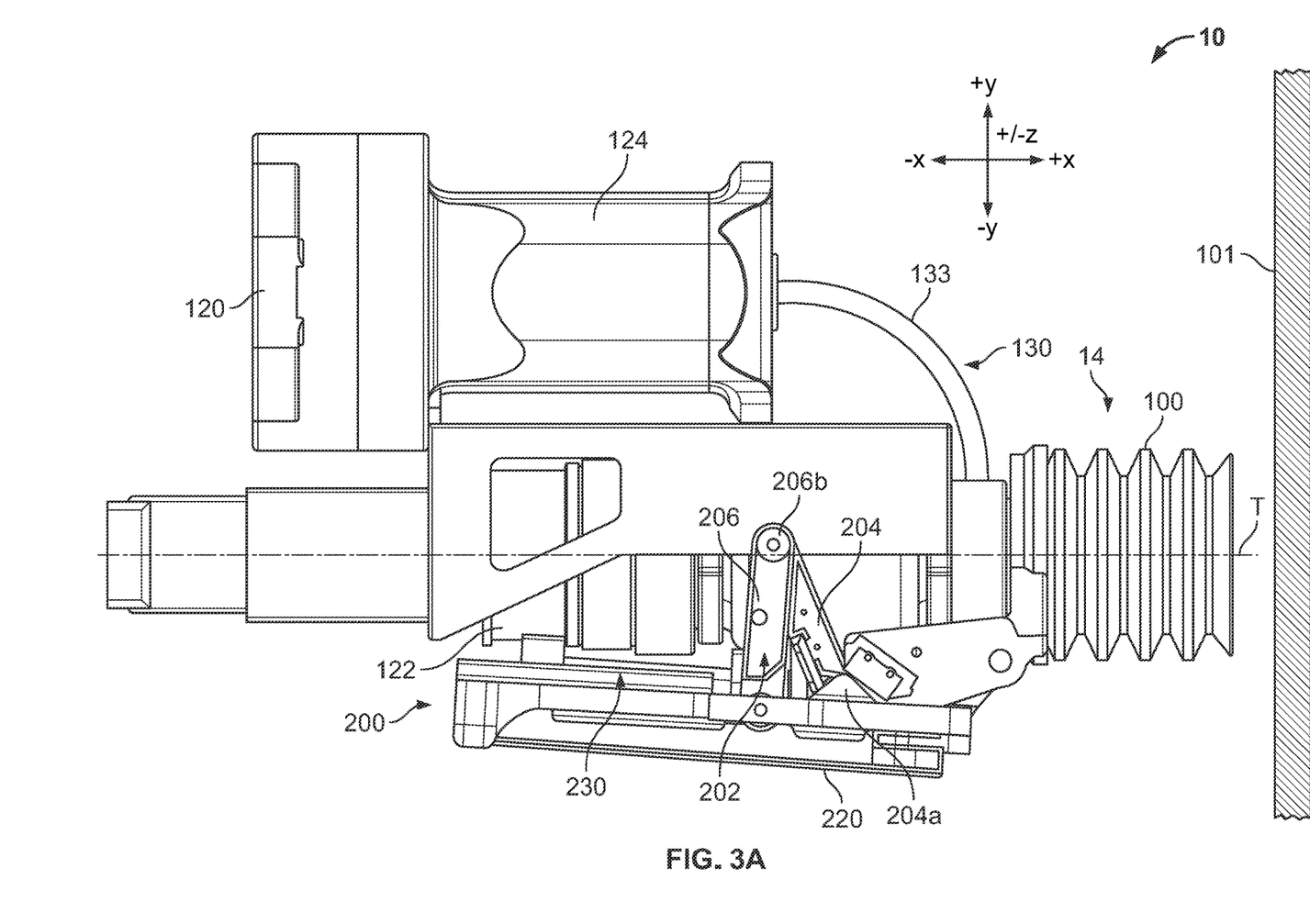
FIG. 3A schematically depicts a side view of the gripping assembly of FIG. 1 including an adhesive assembly in a retracted position, according to one or more embodiments shown and described herein.
Figure 3B:
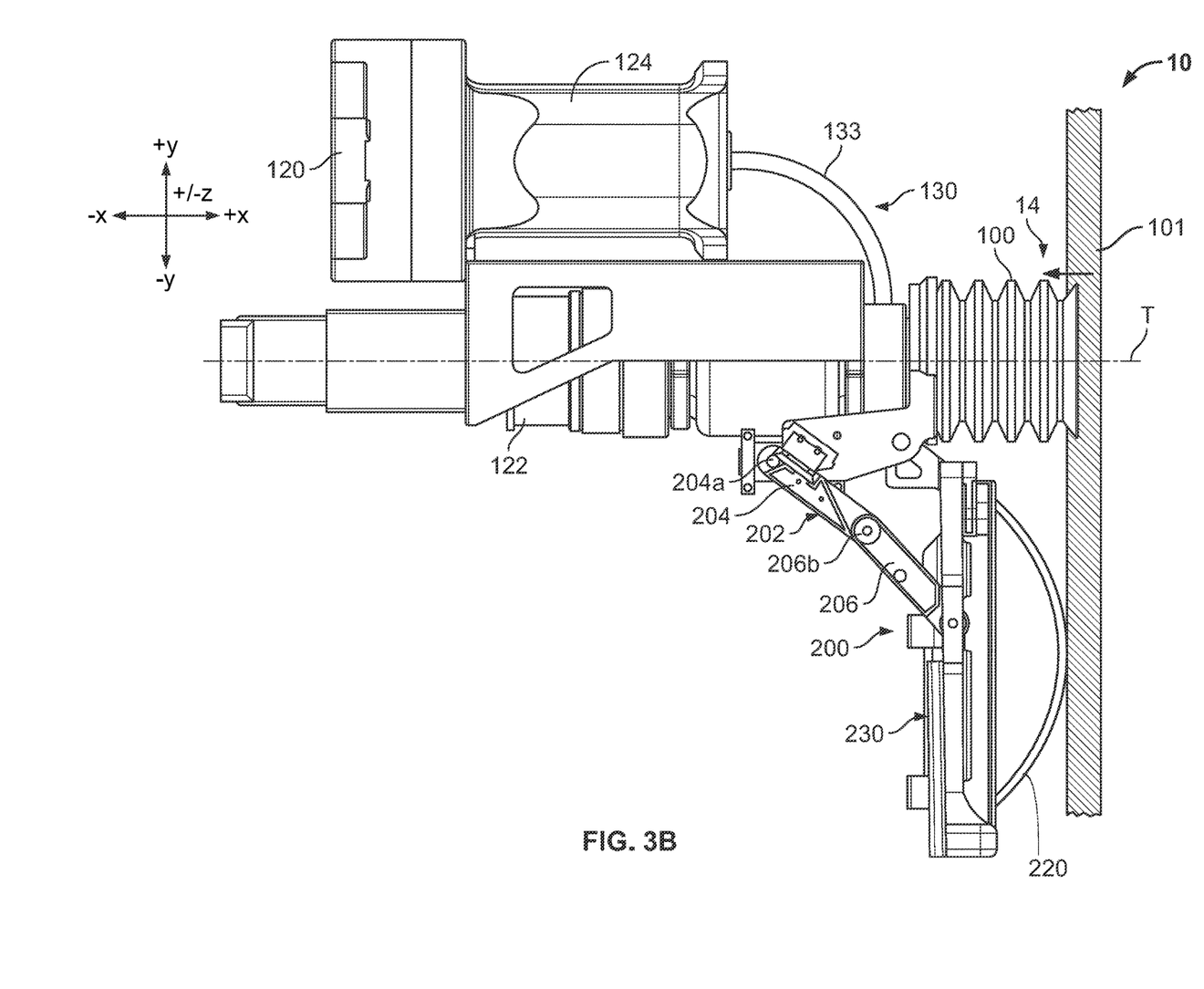
FIG. 3B schematically depicts a side view of the gripping assembly of FIG. 1 with the adhesive assembly in an extended position, according to one or more embodiments shown and described herein.

In order for the adhesive assembly 200 to effectively aid in side grasp operations without impacting the maneuverability of the gripping assembly 10, the adhesive assembly 200 may be actuated between a retracted position and an extended position, as is most clearly depicted in FIGS. 3A and 3B, respectively. In these embodiments, the arm member 202 may be operable to actuate the adhesive assembly 200 between a retracted position and an extended position. For example, the arm member 202 may include one or more links pivotally coupling the adhesive assembly 200 to the suction tool assembly 14. Specifically, the arm member 202 may include a first link 204 pivotally connected to the tool assembly 14 at a first pivot 204a, and pivotally connected to a second link 206 at a second pivot 206b. The second link 206 may then be pivotally connected to the adhesive assembly 200 to permit the adhesive assembly 200 to rotate relative to the suction tool assembly 14 during operation of the arm member 202.

As shown in FIG. 3A, the adhesive assembly 200 may be positioned adjacent the connection mechanism 130 of the suction tool assembly 14 in the retracted position, such that the adhesive assembly 200 is positioned parallel to, or at least substantially parallel to, a tool longitudinal axis T of the gripping assembly 10 that extends in a longitudinal direction (e.g., in the +/−x-direction as depicted in the coordinate axes of FIGS. 3A and 3B) through the gripping mechanism 11.

In these embodiments, the adhesive assembly 200 may be positioned in the retracted position when the gripping assembly 10 is being positioned adjacent the object 101 to be grasped. For example, in embodiments in which the gripping assembly 10 is utilized to grasp an object positioned on a shelf, or other similarly confined space, the arm member 202 may be operated such that the adhesive assembly 200 is moved to the retracted position when the gripping assembly 10 is moved, to prevent the adhesive assembly 200 from interfering with positioning of the gripping assembly 10.

With the gripping assembly 10 positioned adjacent the object, the arm member 202 may be actuated to move the adhesive assembly 200 from the retracted position to the extended position, as is depicted in FIG. 3B. In the extended position, the adhesive assembly 200 may be positioned away from the connection mechanism 130 of the suction tool assembly 14, such that the adhesive assembly 200 may be positioned perpendicularly to the tool longitudinal axis T of the gripping assembly 10. As will be described in additional detail herein, the adhesive assembly 200 may be operable to engage the object 101 being gripped by the gripping assembly 10 when the adhesive assembly 200 is actuated to the extended position and the engagement mechanism is operated in an active state, as shown in FIG. 3B.

Figure 4A:
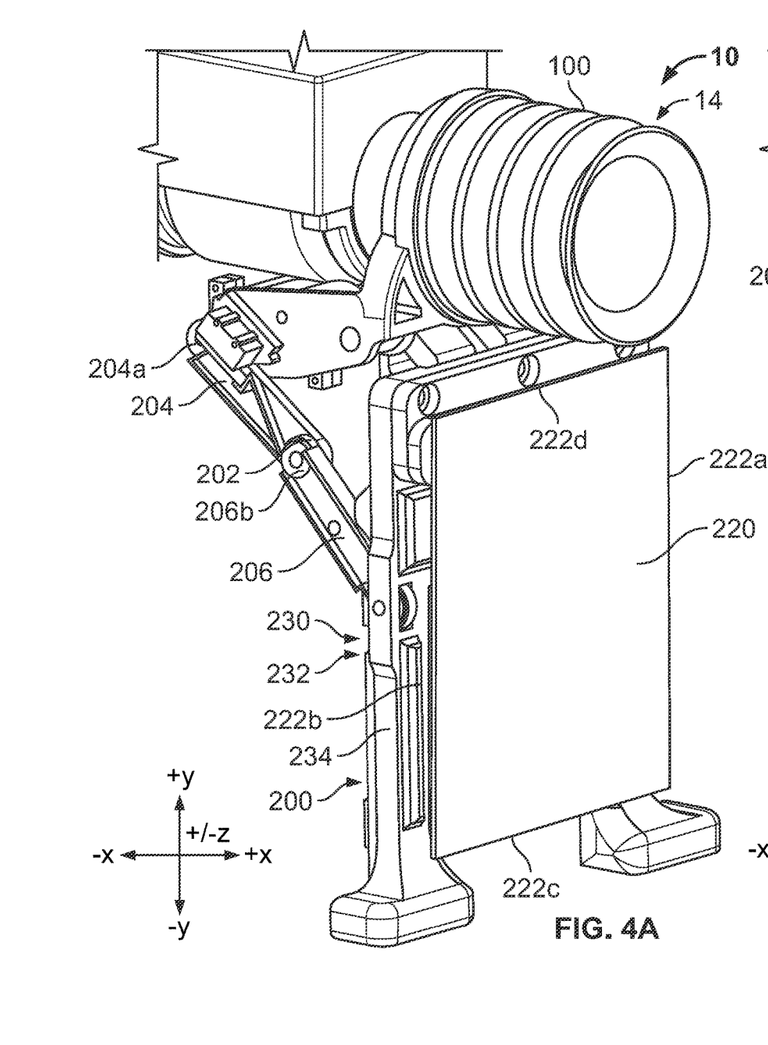
FIG. 4A schematically depicts a perspective view of the adhesive assembly of the gripping assembly of FIG. 1 including an adhesive sheet, according to one or more embodiments shown and described herein.
Figure 4B:
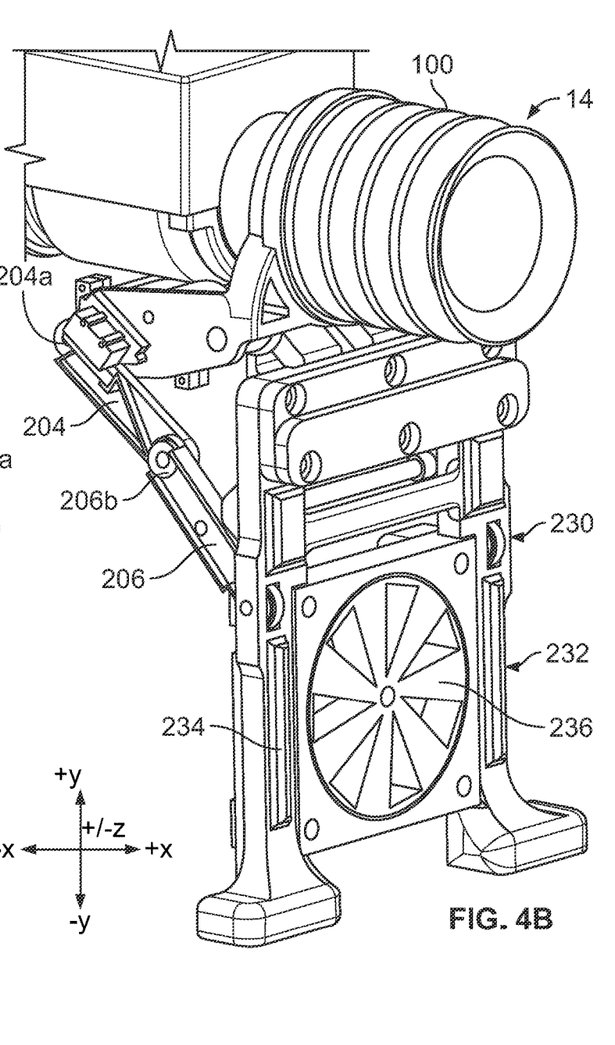
FIG. 4B schematically depicts a perspective view of the adhesive assembly of the gripping assembly of FIG. 1 with the adhesive sheet removed, according to one or more embodiments shown and described herein.

Turning now to FIGS. 4A and 4B, the adhesive assembly 200 is depicted in the extended position. With the adhesive assembly 200 positioned in the extended position, the engagement mechanism 230 may be operated between an active state, in which the engagement mechanism 230 causes the adhesive sheet 220 to engage the object 101, as shown in FIG. 3B, and an inactive state, in which the adhesive sheet 220 disengages the object 101. In these embodiments, the engagement mechanism 230 may be any mechanism capable of forcing the adhesive sheet 220 to extend away, e.g., bow, from the adhesive assembly 200 and contact the object 101 being grasped.

For example, as depicted in FIGS. 4A and 4B, the engagement mechanism 230 may include a fan assembly 232 including a frame 234 and a fan component 236 mounted within the frame 234. In these embodiments, when the engagement mechanism 230 is operated in the active state, the fan component 236 may rotate within the frame 234, such that the fan assembly 232 generates airflow that is directed towards the adhesive sheet 220, which is removed in FIG. 4B to illustrate the fan component 236 of the engagement mechanism 230 provided behind the adhesive sheet 220.

In these embodiments, and as shown most clearly in FIG. 4A, at least a portion of a perimeter of the adhesive sheet 220 may be fixedly coupled to the frame 234 of the fan assembly 232. For example, the adhesive sheet 220 may include a plurality of perimeter sides, such as a first perimeter side 222a, a second perimeter side 222b opposite the first perimeter side 222a, a third perimeter side 222c that extends perpendicularly between the first perimeter side 222a and the second perimeter side 222b, and a fourth perimeter side 222d positioned opposite the third perimeter side 222c. Accordingly, the adhesive sheet 220 has a rectangular shape corresponding to a shape of the frame 234 of the fan assembly 232. However, it should be appreciated that the adhesive sheet 220 may have any other suitable shape such as circular, elliptical, triangular, and the like. In these embodiments, the shape of the adhesive sheet 220 may be determined based on a shape of the object being grasped, as some adhesive sheet shapes may be more suitable to conform to particularly shaped objects As used herein, reference to any one of the perimeter sides of the adhesive sheet 220 may be collectively referred to as the perimeter sides 222. In these embodiments, at least one of the plurality of perimeter sides 222 may be fixedly coupled to the frame 234 of the fan assembly 232. For example, the fourth perimeter side 222d may be fixed to the frame 234, while leaving the first perimeter side 222a, the second perimeter side 222b, and the third perimeter side 222c free to move away from the frame 234 of the fan assembly 232 when the engagement mechanism 230 is operated in the active state.

By fixedly coupling at least one of the plurality of perimeter sides 222 of the adhesive sheet 220 to the frame 234 of the fan assembly 232, activation of the fan assembly 232 may cause the adhesive sheet 220 to flex in an outward direction away from the fan assembly 232 and towards the object 101 being grasped by the gripping assembly 10. For example, the airflow generated by the fan component 236 when the engagement mechanism 230 is activated may be sufficient to force the adhesive sheet 220 to flex outwardly, as described herein. Once the adhesive sheet 220 contacts the object 101, continued airflow applied from the fan component 236 to the adhesive sheet 220 may cause the adhesive sheet 220 to deform around the object 101 to provide maximum surface contact between the adhesive sheet 220 and the object 101. By increasing the surface contact between the adhesive sheet 220 and the object 101, it may be possible to increase a frictional force acting between the adhesive sheet 220 and the object 101, which may aid in counteracting gravitational forces and other forces acting perpendicularly to the normal gripping force during a side grasp operation.

In these embodiments, the engagement mechanism 230 may remain in the active state throughout a gripping operation in order to ensure that the adhesive sheet 220 maintains contact with the object 101. Once the object 101 has been moved to a desired location, the engagement mechanism 230 may be operated to the inactive state, such that the fan component 236 of the fan assembly 232 ceases rotation and airflow is not directed to the adhesive sheet 220. With the engagement mechanism inactive, the adhesive sheet 220 may automatically disengage the object 101 and return to a substantially flat state against the fan component 236, such that the object 101 may be released from the gripping assembly 10.

In the embodiments described herein, the adhesive sheet 220 may be a dry adhesive sheet made of nylon, or any other similarly flexible material, such that the adhesive sheet 220 is capable of conforming to the object 101 being grasped. Furthermore, in some embodiments, the adhesive sheet 220 may have a coating layer, such as a silicone coating layer, that may serve to increase the strength of the adhesive sheet 220. Similarly, the coating layer may act to provide waterproofing properties to the adhesive sheet 220, which may be beneficial in embodiments in which the gripping assembly 10 is utilized to grasp a wet, cold, and/or frozen object that may include a layer of condensation on its surface. Furthermore, the adhesive sheet 220 may be formed of a material having a shear-force-per-contact-area-capacity of equal to or greater than 50 kPA and less than or equal to 100 kPa. In embodiments, the adhesive sheet 220 has a shear-force-per-contact-area-capacity of at least 70 kPa in order to reliably support the object.

Figure 5A:
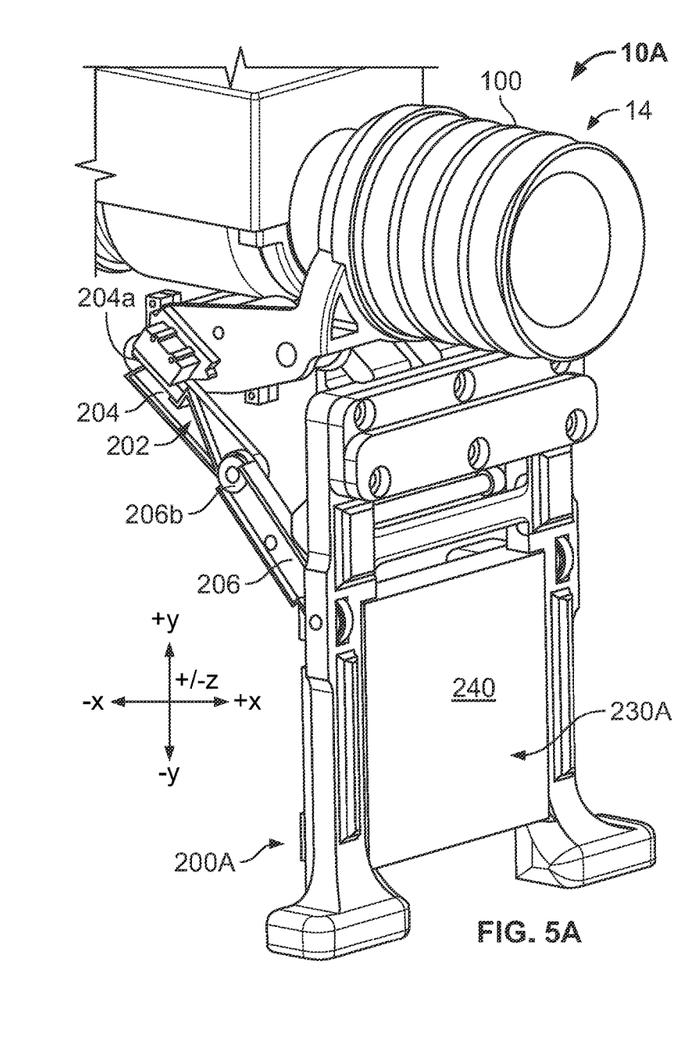
FIG. 5A schematically depicts a perspective view of another embodiment of a gripping assembly, according to one or more embodiments shown and described herein.
Figure 5B:
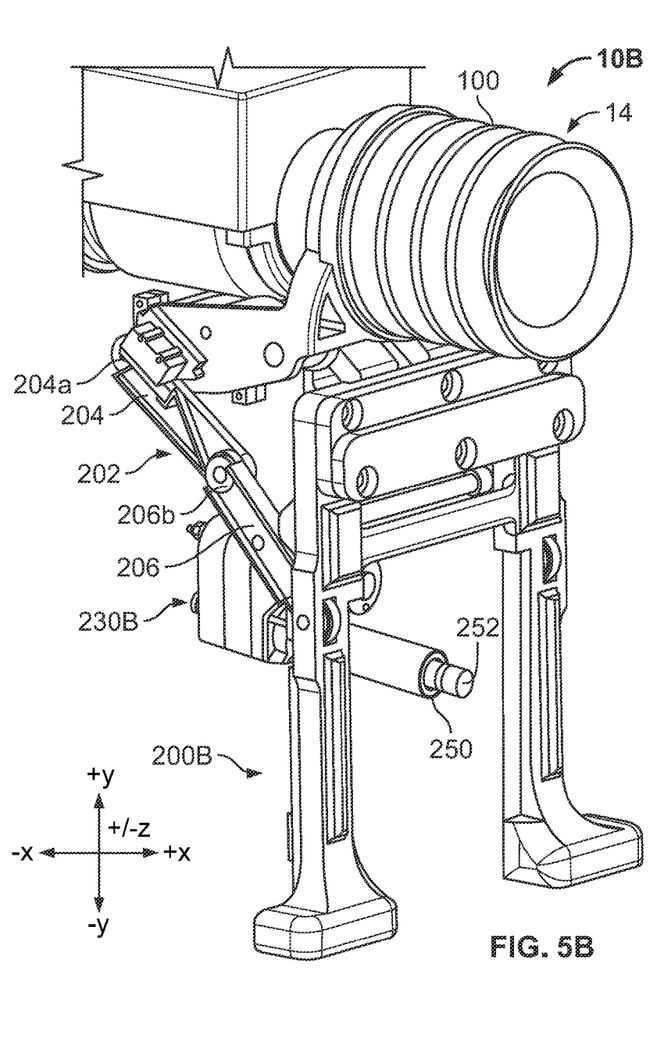
FIG. 5B schematically depicts a perspective view of another embodiment of a gripping assembly, according to one or more embodiments shown and described herein.

Turning now to FIGS. 5A and 5B, additional embodiments of an adhesive assembly are depicted. As has been noted herein, the engagement mechanism 230 of the adhesive assembly 200 may include any mechanism operable to force the adhesive sheet 220 to deform and contact the object being engaged by the gripping assembly 10. For example, as depicted in FIG. 5A, a gripping assembly 10A is partially depicted including an adhesive assembly 200A. The adhesive assembly 200A includes an engagement mechanism 230A including an electrostatic mechanism 240. In these embodiments, when the engagement mechanism 230A is operated to the active state, the electrostatic mechanism 240 may repel the adhesive sheet 220 (not shown in FIG. 5A, but understood as being provided in front of the electrostatic mechanism 240), such that the adhesive sheet 220 extends outwardly from the engagement mechanism 230A and contacts the object. In contrast, when the engagement mechanism 230A is operated to the inactive state, the electrostatic mechanism 240 may attract the adhesive sheet 220, such that the adhesive sheet 220 is pulled towards the engagement mechanism 230A and disengages the object.

In other embodiments, as shown in FIG. 5B, a gripping assembly 10B is partially depicted including an adhesive assembly 200B. The adhesive assembly 200B includes an engagement mechanism 230B including a mechanical pusher 250, which may be actuated between an extended position when the engagement mechanism 230B is in the active state and a retracted position when the engagement mechanism 230B is in the inactive state. For example, when the engagement mechanism 230B is operated to the active state, the mechanical pusher 250 may extend outwardly, such that the mechanical pusher 250 contacts the adhesive sheet 220 (not shown in FIG. 5B, but understood as being provided in front of the mechanical pusher 250) and moves the adhesive sheet 220 in a direction opposite the mechanical pusher 250. In contrast, when the engagement mechanism 230B is in the inactive state, the mechanical pusher 250 may retract, such that the mechanical pusher 250 disengages the adhesive sheet 220 and the adhesive sheet 220 disengages the object being grasped. In other embodiments, it should be appreciated that the adhesive sheet 220 may not be provided in front of the mechanical pusher 250. Rather, in embodiments, a distal end 252 of the mechanical pusher 250 may contact the object 101 itself to limit shear forces on the gripping assembly 10B. Additionally, in embodiments, the distal end 252 of the mechanical pusher 250 may be provided with an adhesive material similar to that forming the adhesive sheet 220. Accordingly, the distal end 252 of the mechanical pusher 250 itself reduces shear forces during operation.

Figure 6:
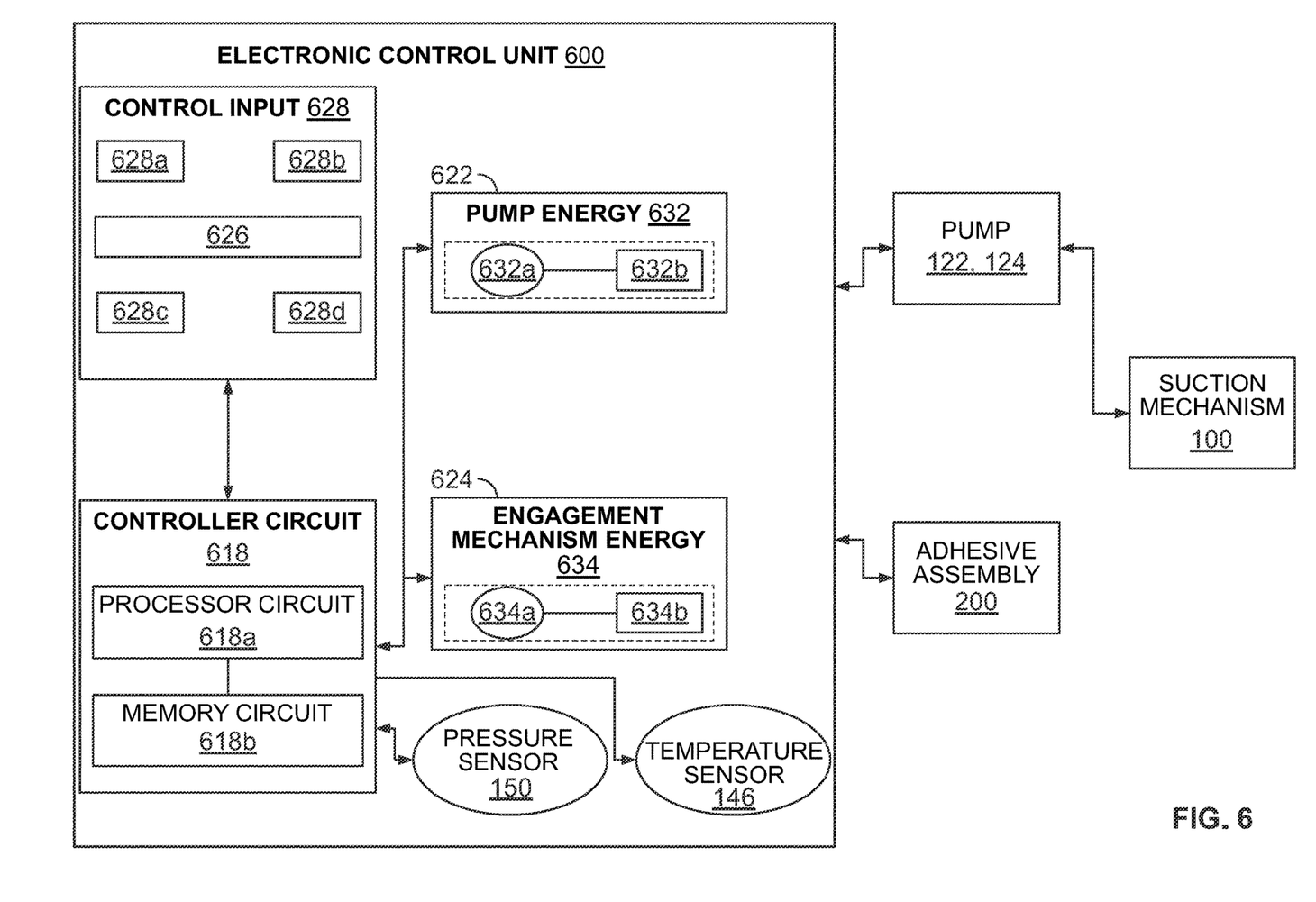
FIG. 6 schematically depicts a schematic view of an electronic control unit for controlling the gripping assembly of FIG. 1, according to one or more embodiments shown and described herein.

As has been described herein, operation of the gripping assembly 10, as well as the gripping assembly 10A and the gripping assembly 10B, may be further controlled via an electronic control unit 600, as depicted in FIG. 6. In these embodiments, the electronic control unit 600 may independently control both gripping mechanism 11 and the adhesive assembly 200. For example, in embodiments in which the gripping mechanism 11 includes the suction tool, the electronic control unit 600 may independently operate at least one of the first pump 122 or second pump 124 and the adhesive assembly 200.

Referring still to FIG. 6, the electronic control unit 600 may include a controller circuit 618, a pump energy source 622, an engagement mechanism energy source 624, the temperature sensor 146, and the pressure sensor 150. The electronic control unit 600 may further include a control input 628, such as a computer, which may allow a user to operate the electronic control unit 600. In these embodiments, the control input 628 may have a battery 626, and may provide automatic control of the electronic control unit 600 via a software program, or may be manually controlled via a user manipulating a user interface thereof.

The control input 628 may include control buttons and visual/aural indicators, such as displays and/or speakers, with the control buttons providing various functions over the electronic control unit 600, and with the visual/aural indicators providing visual/aural feedback to the status of one or more conditions and/or positions of components of the electronic control unit 600. In these embodiments, the control buttons may include one or more buttons 628a, 628b for activating the first pump 122 and/or the second pump 124, and one or more knobs and/or buttons 628c, 628d for operating the engagement mechanism 230 between the active state and the inactive state.

Referring still to FIG. 6, the controller circuit 618 may be electrically and communicatively coupled to the pump energy source 622, the engagement mechanism energy source 624, the temperature sensor 146, the pressure sensor 150, and the control input 628, such as by one or more wires or circuit traces. In these embodiments, the controller circuit 618 may be assembled on an electrical circuit, and may include, for example, a processor circuit 618a and a memory circuit 618b.

The processor circuit 618a may have one or more programmable microprocessors and associated circuitry, such as an input/output interface, buffers, memory, etc. The memory circuit 618b may communicatively coupled to the processor circuit 618a, e.g., via a bus circuit, and may be a non-transitory electronic memory that may include volatile memory circuits, such as random access memory (RAM), and non-volatile memory circuits, such as read only memory (ROM), electronically erasable programmable ROM (EEPROM), flash memory, etc. The controller circuit 618 may be formed as one or more Application Specific Integrated Circuits (ASIC).

The controller circuit 618 may be configured via software and/or firmware residing in the memory circuit 618b to execute program instructions to perform functions associated with the activation of the first pump 122 and/or the second pump 124 and/or the activation of the engagement mechanism 230.

Referring again to FIG. 6, the pump energy source 622 may include a pump module 632. In these embodiments, the pump module 632 may be electrically and controllably coupled to the controller circuit 618. As provided herein, the pump module 632 may be electrically and controllably coupled to the controller circuit 618 by way of electrical wiring or any other suitable electrical connections, such that user inputs on the control input 628 may be relayed to the controller circuit 618 and used to control the power delivered by the pump module 632 to the first and/or second pump 122, 124. In these embodiments, the pump module 632 may include a power source 632*a*, such as an electric motor, to which an electric lead 632*b* is attached.

Similarly, the engagement mechanism energy source 624 may include an engagement energy module 634. The engagement mechanism energy source 624 may be electrically and controllably coupled to the controller circuit 618 by way of electrical wiring or any other suitable electrical connections, such that user inputs on the control input 628 may be relayed to the controller circuit 618 and used to control the power delivered by the engagement energy module 634 to the engagement mechanism 230. In these embodiments, the engagement energy module 634 may include a power source 634*a*, such as an electric motor, to which an electric lead 634*b* is attached.

Referring still to FIG. 6, the temperature sensor 146 and the pressure sensor 150 may be similarly coupled to the controller circuit 618 by way of electrical wiring or any other suitable connections. In these embodiments, the temperature values recorded by the temperature sensor 146 and the pressure values recorded by the pressure sensor 150 may be conveyed to a user via a user interface of the electronic control unit 600. In response to the temperature and/or pressure values recorded by the temperature sensor 146 and the pressure sensor 150, the user may utilize the electronic control unit 600 to adjust various components of the gripping assembly 10.

Figure 7:
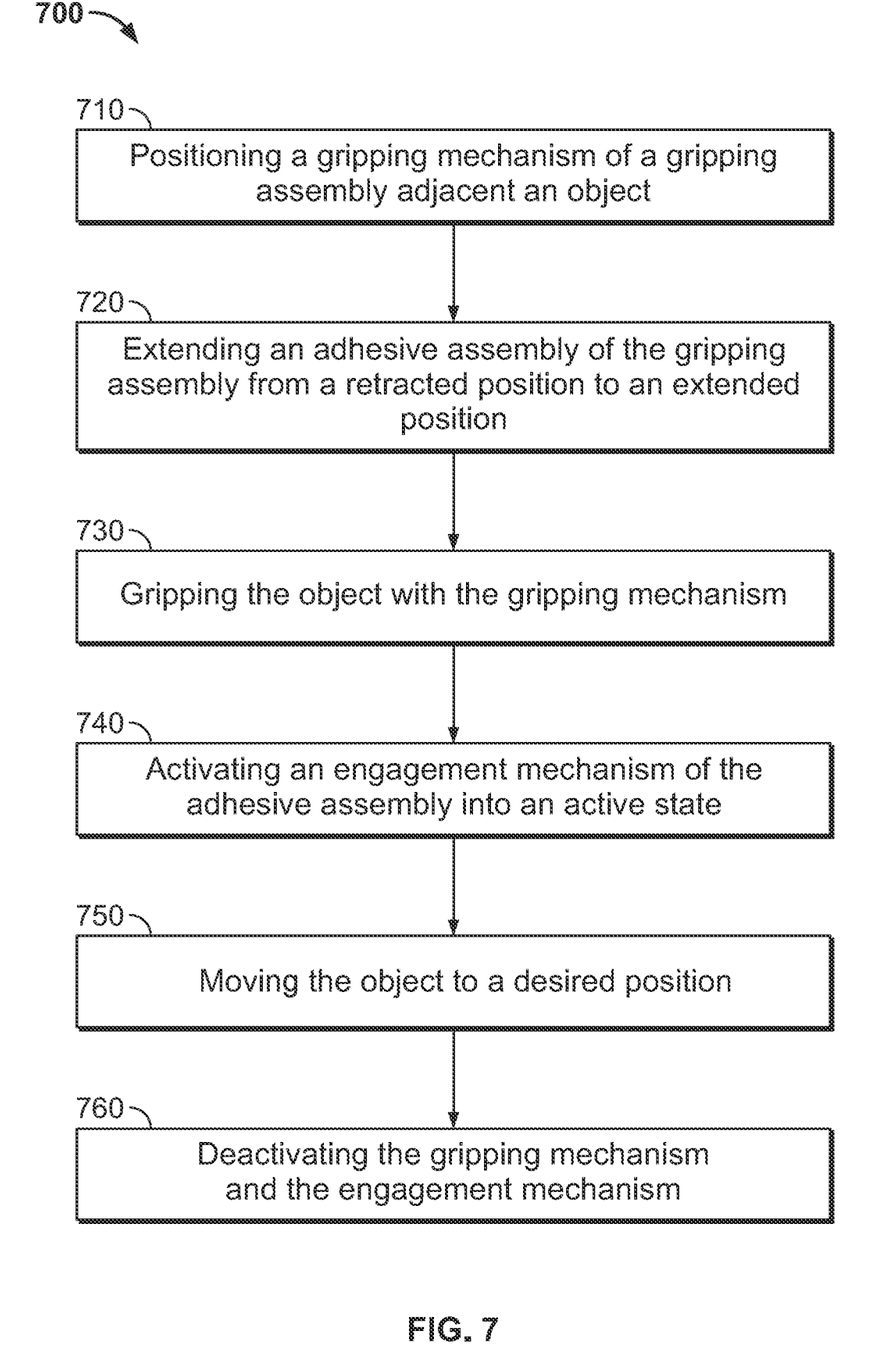
FIG. 7 schematically depicts an illustrative flow diagram of a method of performing a gripping operation using the gripping assembly of FIG. 1, according to one or more embodiments shown and described herein.

Referring now to FIG. 7, an illustrative flow diagram of a method 700 for performing a gripping operation is depicted with reference to the gripping assembly depicted in FIGS. 1-5B and the electronic control unit 600 depicted in FIG. 6. It should be appreciated that similar operation is applicable to the gripping assembly 10A and the gripping assembly 10B described herein.

In these embodiments, the method 700 may begin at block 710, which may involve positioning a gripping mechanism 11 of a gripping assembly 10 adjacent an object 101. As has been described herein, the gripping assembly 10 may further include an adhesive assembly 200 including an engagement mechanism 230 and an adhesive sheet 220. Prior to positioning the gripping mechanism 11, the adhesive assembly 200 may be moved to the retracted position, such that the adhesive assembly 200 is collapsed against the gripping mechanism 11, as is most clearly depicted in FIGS. 2 and 3A.

With the gripping mechanism 11 positioned adjacent the object 101, the method 700 may move to block 720, which may involve extending the adhesive assembly 200 of the gripping assembly 10 from the retracted position to an extended position, such that the adhesive assembly 200 is adjacent the object 101. To deploy the adhesive assembly 200, the arm member 202 may actuate the adhesive assembly 200 to the extended position, such that the adhesive assembly 200 extends perpendicularly to the tool longitudinal axis and is positioned adjacent the object 101 grasped by the gripping mechanism.

With the adhesive assembly 200 deployed, the method 700 may move to block 730, which may involve gripping the object 101 with the gripping mechanism 11. For example, in embodiments in which the gripping mechanism 11 is a suction mechanism 100, as depicted in FIGS. 1-2, the first pump 122 (e.g., the high flow pump) and the second pump 124 (e.g., the high pressure pump) of the suction tool assembly 14 may be activated. In these embodiments, the first valve 142 may be in the open position, such that the first pump 122 may be in fluid communication with the suction mechanism 100, and the second valve 144 may be in the closed position, such that the first pump 122 is unable to draw ambient air from the external environment. As a result, the first pump 122 may provide the first suction force and the first flow rate to the suction mechanism 100, while the second pump 124 may provide the second suction force and the second flow rate to the suction mechanism 100.

In these embodiments, the first flow rate provided by the first pump 122 may be a high flow rate operable to allow the suction tool assembly 14 to initiate contact between the suction mechanism 100 and the object 101. Notably, the high flow rate may allow the suction mechanism 100 to grasp very light and/or irregularly shaped objects on which it may be difficult to create a quality seal.

Once contact has been established between the object 101 and the suction mechanism 100, the first suction force and the second suction force exerted by the first pump 122 and the second pump 124, respectively, may cause the internal pressure within the suction mechanism 100 to drop. As the pressure within the suction mechanism 100 drops, the pressure sensor 150 may continually monitor the pressure within the suction mechanism 100 in order to determine the quality of seal that has been achieved between the suction mechanism 100 and the object 101.

Although the method 700 depicts the adhesive assembly 200 being deployed prior to the object 101 being gripped with the gripping mechanism 11, it should be understood that, in some embodiments, the object 101 may be gripped by the gripping mechanism 11 prior to the adhesive assembly 200 being deployed. Furthermore, in other embodiments, the method steps depicted at block 720 and block 730 may be conducted simultaneously.

Referring still to FIG. 7, the method may further involve activating the engagement mechanism 230 of the adhesive assembly 200 into an active state, such that the adhesive sheet 220 deforms to contact the object, as is depicted at block 740. In these embodiments, the engagement mechanism 230 may remain in the active state until the object 101 has been moved by the gripping assembly 10 to a desired location, as depicted at block 750. Once the object 101 has been moved, the method may move to block 760, which may involve deactivating the engagement mechanism 230 and such that the adhesive sheet 220 moves in a direction opposite the object and disengages the object. Furthermore, the method of block 760 may further involve deactivating the gripping mechanism 11, such that the object 101 is released from the gripping assembly 10.

As previously discussed herein, it should be understood that method 700 may be conducted manually by a user or operated by the electronic control unit 600. Furthermore, in embodiments in which the electronic control unit 600 is used to operate the gripping assembly 10, it should be understood that operation of the gripping assembly 10 may be automated. For example, the electronic control unit 600 may be programmed to automatically activate and/or deactivate the gripping mechanism 11. Similarly, the electronic control unit 600 may be operable to automatically activate or deactivate the engagement mechanism 230 based on the position of the adhesive assembly 200.

As should be appreciated in view of the foregoing, a gripping assembly is described herein. The gripping assembly includes a gripping mechanism for engaging an object and an adhesive assembly coupled to the gripping mechanism. The adhesive assembly includes an adhesive sheet and an engagement mechanism operable between an active state and an inactive state, the engagement mechanism deforming the adhesive sheet to contact the object when operated in the active state.

The terminology used herein is for the purpose of describing particular aspects only and is not intended to be limiting. As used herein, the singular forms "a," "an," and "the" are intended to include the plural forms, including "at least one." unless the content clearly indicates otherwise. "Or" means "and/or." As used herein, the term "and/or" includes any and all combinations of one or more of the associated listed items. It will be further understood that the terms "comprises" and/or "comprising." or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A gripping assembly comprising:
   a gripping mechanism for engaging an object; and
   an adhesive assembly coupled to the gripping mechanism, the adhesive assembly comprising:
   an adhesive sheet;
   an engagement mechanism operable between an active state and an inactive state, the engagement mechanism deforming the adhesive sheet to contact the object when operated in the active state; and
   an arm extending between the gripping mechanism and the engagement mechanism and movable between a retracted position and an extended position for moving the engagement mechanism.

2. The gripping assembly of claim 1, wherein the adhesive assembly extends perpendicular to a tool longitudinal axis when the arm is in the extended position, and wherein the adhesive assembly extends parallel to the tool longitudinal axis when the arm is in the retracted position.

3. The gripping assembly of claim 2, wherein the adhesive assembly engages the object when the arm is in the extended position and the engagement mechanism is operated in the active state.

4. The gripping assembly of claim 1, wherein the engagement mechanism includes a fan assembly having a frame and a fan component mounted within the frame.

5. The gripping assembly of claim 4, wherein at least a portion of a perimeter of the adhesive sheet is fixedly attached to the frame of the fan assembly.

6. The gripping assembly of claim 5, wherein activation of the fan component causes the adhesive sheet to flex in a radially outward direction away from the fan component.

7. The gripping assembly of claim 2, wherein the engagement mechanism includes an electrostatic mechanism operable to repel the adhesive sheet when the engagement mechanism is operated in the active state and attract the adhesive sheet when the engagement mechanism is in the inactive state.

8. The gripping assembly of claim 2, wherein the engagement mechanism includes a mechanical pusher operable to move the adhesive sheet in a direction opposite the mechanical pusher when in the active state and permit the adhesive sheet to move in a direction toward the mechanical pusher when in the inactive state.

9. The gripping assembly of claim 1, wherein the adhesive sheet is a dry adhesive sheet having a shear-force-per-contact-area-capacity of at least 70 kPa.

10. The gripping assembly of claim 1, further comprising an electronic control unit that independently operates the gripping mechanism and the adhesive assembly.

11. A suction tool assembly comprising:
    a suction cup;
    a pump in fluid communication with the suction cup to provide a suction force to the suction cup for engaging an object; and
    an adhesive assembly comprising:
    an adhesive sheet;
    an engagement mechanism operable between an active state and an inactive state, the engagement mechanism deforming the adhesive sheet to contact the object when operated in the active state;
    an arm movable between a retracted position and an extended position for moving the engagement mechanism; and
    an electronic control unit that independently operates each of the pump and the adhesive assembly.

12. The suction tool assembly of claim 11, wherein the adhesive assembly extends perpendicular to a suction tool assembly longitudinal axis when the arm is in the extended position, and wherein the adhesive assembly extends parallel to the suction tool assembly longitudinal axis when the arm is in the retracted position.

13. The suction tool assembly of claim 11, wherein the engagement mechanism includes a fan assembly having a frame and a fan component mounted within the frame.

14. The suction tool assembly of claim 13, wherein at least a portion of a perimeter of the adhesive sheet is fixedly attached to the frame of the fan assembly.

15. The suction tool assembly of claim 14, wherein activation of the fan component causes the adhesive sheet to flex in a radially outward direction away from the fan component.

16. The suction tool assembly of claim 11, wherein the adhesive sheet is a dry adhesive sheet having a shear-force-per-contact-area-capacity of at least 70 kPa.

17. A method comprising:
    positioning a gripping mechanism of a gripping assembly adjacent an object, the gripping assembly comprising an adhesive assembly including an arm, an engagement mechanism, and an adhesive sheet;
    extending the arm of the adhesive assembly from a retracted position to an extended position, such that the adhesive sheet is adjacent the object;

gripping the object with the gripping mechanism; and
activating the engagement mechanism of the adhesive assembly into an active state such that the adhesive sheet deforms to contact the object.

18. The method of claim 17, wherein deforming the adhesive sheet includes moving at least a portion of the adhesive sheet in a direction toward the object by operating the engagement mechanism.

19. The method of claim 17, further comprising deactivating the engagement mechanism such that the adhesive sheet moves in a direction opposite the object and disengages the object.

20. The method of claim 19, further comprising moving the arm from the extended position to the retracted position.

* * * * *

UNITED STATES PATENT AND TRADEMARK OFFICE
CERTIFICATE OF CORRECTION

| | | |
|---|---|---|
| PATENT NO. | : 12,226,893 B2 | Page 1 of 1 |
| APPLICATION NO. | : 18/182002 | |
| DATED | : February 18, 2025 | |
| INVENTOR(S) | : Lukas S. Kaul and Amar Hajj-Ahmad | |

It is certified that error appears in the above-identified patent and that said Letters Patent is hereby corrected as shown below:

In the Specification

In Column 4, Line(s) 12, after "pump 120", delete "." and insert --,--, therefor.

In Column 8, Line(s) 28, after "objects", insert --.--.

Signed and Sealed this
Twenty-fifth Day of March, 2025

Coke Morgan Stewart
*Acting Director of the United States Patent and Trademark Office*